United States Patent [19]

Kitagawa

[11] Patent Number: 5,604,591
[45] Date of Patent: Feb. 18, 1997

[54] METHOD OF MEASURING PHASE DIFFERENCE AND APPARATUS FOR CARRYING OUT THE SAME

[75] Inventor: Junichi Kitagawa, Hachioji, Japan

[73] Assignee: Olympus Optical Co., Ltd., Tokyo, Japan

[21] Appl. No.: 420,837

[22] Filed: Apr. 11, 1995

[30] Foreign Application Priority Data

Apr. 11, 1994 [JP] Japan .................................. 6-072115
Sep. 21, 1994 [JP] Japan .................................. 6-226587

[51] Int. Cl.$^6$ ........................................... G01B 9/02
[52] U.S. Cl. .......................................... 356/351; 356/361
[58] Field of Search ................................... 356/345, 351, 356/361

[56] References Cited

U.S. PATENT DOCUMENTS

| | | | |
|---|---|---|---|
| 4,798,468 | 1/1989 | Ohuchi | 356/351 |
| 5,162,648 | 11/1992 | Iwasaki | 356/352 |
| 5,243,649 | 9/1993 | Franson | 356/351 |
| 5,253,038 | 10/1993 | Bouwhuis et al. | 356/351 |
| 5,392,116 | 2/1995 | Makosch | 356/351 |

FOREIGN PATENT DOCUMENTS 4-151662A 5/1992 Japan .

Primary Examiner—Frank Gonzalez
Assistant Examiner—Robert Kim
Attorney, Agent, or Firm—Watson Cole Stevens & Davis, P.L.L.C.

[57] ABSTRACT

A phase difference introduced by a half-tone mask including transparent portions and phase shift portions is measured by projecting two light fluxes onto these portions and forming an interference image by combining the two light fluxes. A light flux emitted by a light source is converted by a rotatable polarizer into a linearly polarized light flux having a polarizing direction which can be adjusted at will by rotating the polarizer, and then the linearly polarized light flux is transmitted through a birefringent prism to obtain two light fluxes polarized in different directions. Intensities of these light fluxes can be adjusted in opposite senses by rotating the polarized such that intensities of light fluxes emanating from the photomask become substantially identical with each other. One of the two light fluxes is made incident upon the transparent portion and the other light flux is made incident upon the phase shift portion. The two light fluxes transmitted through the photomask are combined by a birefringent prism and a phase compensating plate to obtain an interference image. By detecting an intensity of the interference image, the phase difference introduced by the photomask can be measured.

26 Claims, 8 Drawing Sheets

FIG_8
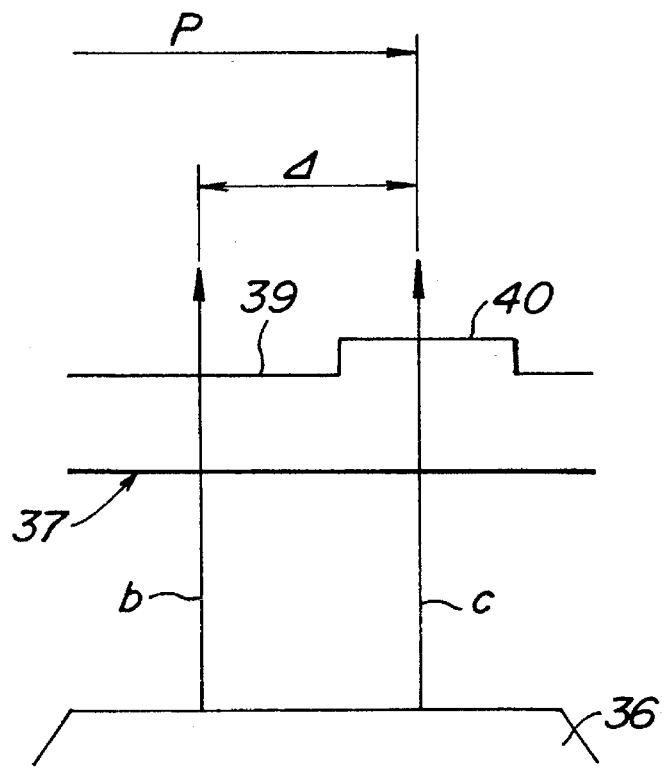
FIG_9
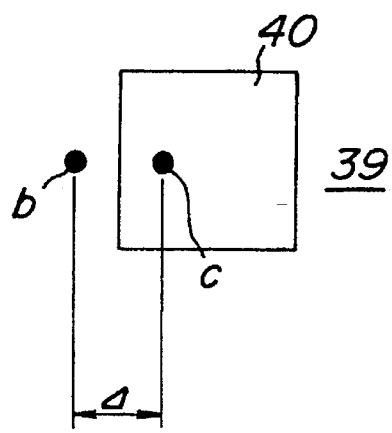

METHOD OF MEASURING PHASE DIFFERENCE AND APPARATUS FOR CARRYING OUT THE SAME

BACKGROUND OF THE INVENTION

1. Field of the Invention

The present invention relates to a method of measuring a phase difference and an apparatus for carrying out such a method. For instance, in a photolithography used in a manufacture of semiconductor devices, photomasks and reticles are used as originals for pattern projection. These photomasks and reticles are checked by such phase difference measuring method and apparatus. Particularly, a phase difference introduced by a photomask having a phase shift region within a pattern is measured,

2. Related Art Statements

A degree of integration of semiconductor devices has been increased and a semiconductor device manufacturing technique has required a higher definition. After the reduction exposure method has been developed, the precise working has been advanced. Recently there have been proposed various methods of increasing a resolution of a projected pattern image, such as a modified illumination method and phase shift method.

In the phase shift method, a phase shift film is provided on a photomask in order to introduce a phase difference. There have been proposed a Levenson type photomask in which a phase shift film is applied on a pattern and a half-tone photomask in which a pattern has a phase difference as well as a half-tone, both of said photomasks performing similar functions. In either case, upon checking the photomask, it is required to measure a phase difference introduced by the phase shift film. However, heretofore there has not been established any effective method for measuring the phase difference.

A phase difference may be measured by various means such as a Mach-Zehnder interferometer, a Michelson interferometer, a film thickness measuring method by spectroscopy, a heterodyne method and a Nomarski method.

In the Mach-Zehnder interferometer and Michelson interferometer, a light flux is divided by a beam splitter into a reference light flux and a measuring light flux, a photomask without a phase shift film and a photomask with a phase shift film are inserted in the reference light flux and measuring light flux, respectively, and an interference image produced by the phase difference is analyzed.

In the film thickness measuring method, a thickness of a phase shift film is measured with the aid of a spectrometer and ellipsometer, and an introduced phase difference is estimated from the measured thickness. In the heterodyne method, an interference image due to the phase difference is analyzed by a method similar to the interference method.

The heterodyne method has been described in "Transmission and Reflection Phase Measurement with Differential Optical Heterodyne Method Takeno Ode et al, " Japan Society of Laser Microscope, 11th Meeting, Themes 1993, An example of the heterodyne method has been disclosed in "Direct Phase Measurement in Phase Shift Masks with Differential Heterodyne Interferometer", Hiroshi Fujita et al, 54th Applied Physics Meeting Preliminary Document No. 2, 28a-SHF-22. In this method, two light fluxes having a slightly different frequencies are laterally shifted on an optical axis with the aid of an acoustic-optical (AO) element, and light fluxes transmitted through mask portions with and without a phase shifter are detected as a heterodyne beat signal on a photodiode. The above lateral shift may be adjusted by a frequency modulation of the AO element.

The above mentioned Nomarski method has been described in, for instance Japanese Patent Application Laid-open Publication Kokai Hei 4-151662; "Phase Shift and Image Quality Measurement with UV Light in Photomask Evaluation", Tsuyoshi Fujiwara et al, 41st Applied Physics Joint Meeting Preliminary Document No. 2 28p-MV-14; and "Interferometer for phase measurements in phase shift masks", Derek B. Dove et al (SPIE) Vol. 1809, p. 128–136, 1992.

In the above mentioned Kokai Hei 4-151662, there is explained a Normaski observing method used in a microscope, in which a linearly polarized beam having a wavelength which is identical with that of an exposing light flux is divided by a birefringent prism and condenser lens into two light fluxes which have different polarized components and are shifted laterally from each other. These two light fluxes are transmitted through a photomask and an objective lens system and are combined again by means of a birefringent prism. A phase difference adjusting means is arranged in this optical path, and an intensity of interference of portions corresponding to the phase shift film of the pattern image is measured, In this case, a lateral shift separated on the photomask corresponds to a phase difference between a transparent portion and a phase shift portion of the photomask, so that the phase difference can be measured by detecting an intensity of the interference.

Fujiwara et al utilizes the same optical system as that disclosed in the above Kokai Hei 4-151662 and a phase shift is measured by using a combination of a phase shift interference method utilizing the phase difference adjusting means and a phase modulation method due to a movement of a Nomarski prism.

Derek D. Dove et al have proposed the phase shift interference method by a voltage modulation using an eletro-optical crystal as the phase modulating means, while a laser light source is used in a basic construction which is similar to that of the above mentioned Kokai Hei 4-151662.

When a half-tone mask is checked by using the above mentioned known phase difference measuring methods and apparatuses, a density of a relevant region is changed in accordance with a content of a pattern, so that there might be generated a remarkable difference between the reference light flux and the measuring light flux. This results in an large decrease in a contrast of interference fringes, and in a worse case, the interference fringes might be buried under one of the light fluxes and could not be detected at all.

In the Mach-Zehnder method and Michelson method, the interferometers are liable to be influenced by mechanical vibration and a optical path difference of the two light fluxes has to be controlled or adjusted on a wavelength level. Further, in order to perform a correct measurement, the photomask and objective lens system should have the same transmission wave front on the reference light flux path and measuring light flux path except for the phase shift film. The heterodyne method has similar problems, and further has a problem that adjustment of optical elements is difficult, so that the measurement could not be performed easily. In the thickness measurement method, the phase difference has to be estimated from the measured thickness of the phase shift film, so that there might be introduced a relatively large error.

In the above mentioned heterodyne method proposed by Ode, there are problems in stability of laser mode, isolation of the AO element and phase characteristic of a signal receiving amplifier. Therefore, adjustment of an actual apparatus is very critical and the measurement could not be carried out simply. Moreover, it is rather difficult to obtain a laser light source emitting stably a laser light beam having the same wavelength as that of the pattern exposing light such as i-ray. Therefore, a phase difference at i-ray has to be presumed from a measured phase difference using other ray.

In the known Nomarski method disclosed in the above mentioned Kokai Hei 4-151662, a phase difference is derived from an amount of a phase difference adjustment between the two light fluxes at which an intensity of the interference image due to the phase shift region in the pattern becomes maximum and minimum. However, a difference between the maximum intensity and the minimum intensity is very small, so that a phase difference adjustment amount could not be determined precisely. Therefore, it is very difficult to set a threshold value for the phase difference adjustment amount, and a precise measurement could not be performed and human error is liable to be introduced.

In the phase shift interference method using the Nomarski prism disclosed in Fujiwara et al and D. B. Dove et al, an amount of separation of the two light fluxes due to the Nomarski prism corresponds to a pitch of the transparent portions and phase shift portions on the reticle. When a pattern includes a relatively large pitch, an amount of separation should be made large accordingly, so that a volume of the Nomarski prism becomes inherently large and the prism could not be easily installed in known microscopes. When an amount of separation is large, there might be generated adjacent double images, which affects the measurement.

Fujiwara et al have tried to perform the separation and the phase difference adjustment simultaneously by moving the Nomarski prism, however the prism is larger than a prism usually provided in a differential interferometer, and thus the movement of the prism within a small range could not be carried out precisely.

D. B. Dove et al have proposed to use the phase modulating method using the voltage modulation for the electro-optic crystal, so that a quick response can be attained and a static modulation can be performed. However, in the electro-optical crystal, a range over which the phase difference between the two light fluxes can be introduced could not be made wide, so that the application to the reticle is limited by a maximum allowable amount of phase shift as well as by the electro-optic crystal.

The Nomarski method can be applied to the Levenson type photomask, but could not be applied to the half-tone type photomask, because in the half-tone photomask, there is produced a difference in intensity between the reference light flux and the measurement light flux.

SUMMARY OF THE INVENTION

The present invention has for its object to provide novel and useful method and apparatus for measuring a phase difference, in which the above mentioned drawbacks of the known methods and apparatuses can be mitigated and a phase difference in a half tone mask can be measured easily and precisely.

According to a first aspect of the invention, an apparatus for measuring a phase difference of an object having a pattern including a transparent portion which transmits a light flux and a phase shift portion which changes an intensity as well as a phase of a light flux, comprises:

a light source means for emitting a light flux;

a polarization rotating means for converting the light flux emitted by said light source means into a linearly polarized light flux whose polarizing direction can be rotated at will;

a beam separating means having a birefringency for dividing said linearly polarized light flux into two light fluxes whose polarizing directions are different from each other;

a condenser lens system for projecting said two light fluxes onto the object to be measured;

an objective lens system for forming an image of the pattern of the object by said two light fluxes;

a phase difference adjusting means for changing a phase difference between said two light fluxes; and a detecting means for selectively detecting given linearly polarized components of an interference image formed by the two light fluxes.

In a preferable embodiment of the phase difference measuring apparatus according to the invention, there is further provided a means for integrating the interference image on time. Further, the phase difference measuring apparatus comprises a means for detecting a ratio of a transmissivity of the transparent portion of the object under inspection with respect to a transmissivity of the phase shift portion to derive a transmissivlty ratio signal, a means for controlling said polarization rotating means in accordance with said transmissivity ratio signal, a photodetecting means for converting the interference image into an electric signal, and a means for processing said electric signal.

In another preferable embodiment of the phase difference measuring apparatus according to the first aspect of the present invention, said separating means includes a birefringent prism, and a separation angle of the two light fluxes by said birefringent prism and a focal length of said condenser lens system are set such that when said two light fluxes are projected onto the object under inspection by means of said condenser lens system, a distance of the two light fluxes viewed on the object under inspection becomes substantially identical with a distance between a transparent portion and a phase shift portion adjacent to said transparent portion.

In another preferable embodiment of the phase difference measuring apparatus according to the first aspect of the present invention, said separating means includes a birefringent prism, and a separation angle of the two light fluxes by said birefringent prism and a focal length of said condenser lens system are set such that when said two light fluxes are projected onto the object under inspection by means of said condenser lens system, a distance of the two light fluxes viewed on the object under inspection is set to such a value that one of the two light fluxed is made incident upon a transparent portion and the other light flux is made incident upon a phase portion adjacent to said transparent portion.

According to the invention, said polarization rotating means may comprise a polarizing plate which is arranged rotatably about an optical axis.

In a preferable embodiment of the phase difference measuring apparatus according to the first aspect of the invention, the object under inspection is constituted by a photomask whose image is projected onto a workpiece by means of a projection device, and said light source means emits a light flux having the same wavelength as that of light used in said projection device.

According to a second aspect of the present invention, an apparatus for measuring a phase difference of an object having a pattern including a transparent portion which transmits a light flux and a phase shift portion which provides a given phase difference to a light flux transmitted therethrough, comprises:

a light source means for emitting a light flux;

a polarization rotating means for converting the light flux emitted by said light source means into a linearly polarized light flux whose polarizing direction can be rotated at will;

a beam separating means having a birefringency for dividing said linearly polarized light flux into two light fluxes whose polarizing directions are different from each other;

a condenser lens system for projecting said two light fluxes onto the object under inspection;

an objective lens system for forming an image of the pattern of the object under inspection by said two light fluxes;

an imaging means for combining said two light fluxes transmitted through said objective lens system;

a phase difference adjusting means having a birefringency for changing a phase difference between said two light fluxes; and a detecting means for selectively detecting a given linearly polarized component of an interference image of the two light fluxes;

wherein a separation distance $\Delta$ of said two light fluxes on the object under inspection and a standard value P representing a distance between a transparent portion and a phase shift portion adjacent to said transparent portion are set to satisfy the following condition:

$$0.25 \leq \Delta/P \leq 2.0$$

In a preferable embodiment of the phase difference measuring apparatus according to the second aspect of the invention, said separating means comprises a birefringent prism, said combining means comprises a birefringent prism, and said birefringent prism of said separating means is constructed to satisfy the following condition:

$$\Delta/P = f \cdot \theta/P = f' \cdot \theta'/P$$

wherein $\theta$ is a separation angle by said separating means, f is a focal length of said condenser lens system, $\theta'$ is a combining angle of said combining means, and f' is a focal length of said objective lens system.

According to a third aspect of the present invention, a method of measuring a phase difference introduced by an object having a pattern of transparent portions and phase shift portions comprises the steps of:

projecting two light fluxes linearly polarized in mutually different directions onto the object under inspection such that one of the two light flux is made incident upon a transparent portion and the other light flux is made incident upon a phase shift portion adjacent to said transparent portion;

combining the two light fluxes transmitted through said object by means of a phase difference adjusting means to form an interference image;

detecting a predetermined polarized component of the interference image to derive an electric signal representing the interference image;

changing a phase difference introduced by said phase difference adjusting means in a stepwise manner; and calculating a phase difference introduced by said object under inspection by processing said electric signal in accordance with the phase differences introduced by said phase difference adjusting means.

In a preferable embodiment of the method according to the invention, said phase difference $\phi(x,y)$ introduced by the object under inspection is calculated in accordance with the phase difference $\delta_i$ introduced by said phase difference adjusting means and intensity $I_i(x, y)$ by performing the following calculation:

$$\phi(x, y) = -\tan^{-1}\left[\frac{\sum_{i=0}^{n-1} I_i(x, y)\sin\delta_i}{\sum_{i=0}^{n-1} I_i(x, y)\cos\delta_i}\right] \quad (3)$$

In another preferable embodiment of the method according to the invention, said phase difference $\delta_i$ introduced by said phase difference adjusting means is changed to 0, $\pi/2$, $\pi$ and $3\pi/2$ successively by rotating the polarizer in an intermittent manner, intensities $I_0$, $I_1$, $I_2$ and $I_3$ are successively measured at said phase differences, and the phase difference $\phi(x, y)$ introduced by the object under inspection is calculated as follows:

$$\phi(x, y) = -\tan^{-1}\frac{I_3 - I_1}{I_0 - I_2} \quad (4)$$

BRIEF DESCRIPTION OF THE DRAWINGS

FIG. 8 is a schematic cross sectional view of the photomask; and

FIG. 9 is a schematic plan view of the photomask.

DESCRIPTION OF THE PREFERRED EMBODIMENTS

Figure 1:
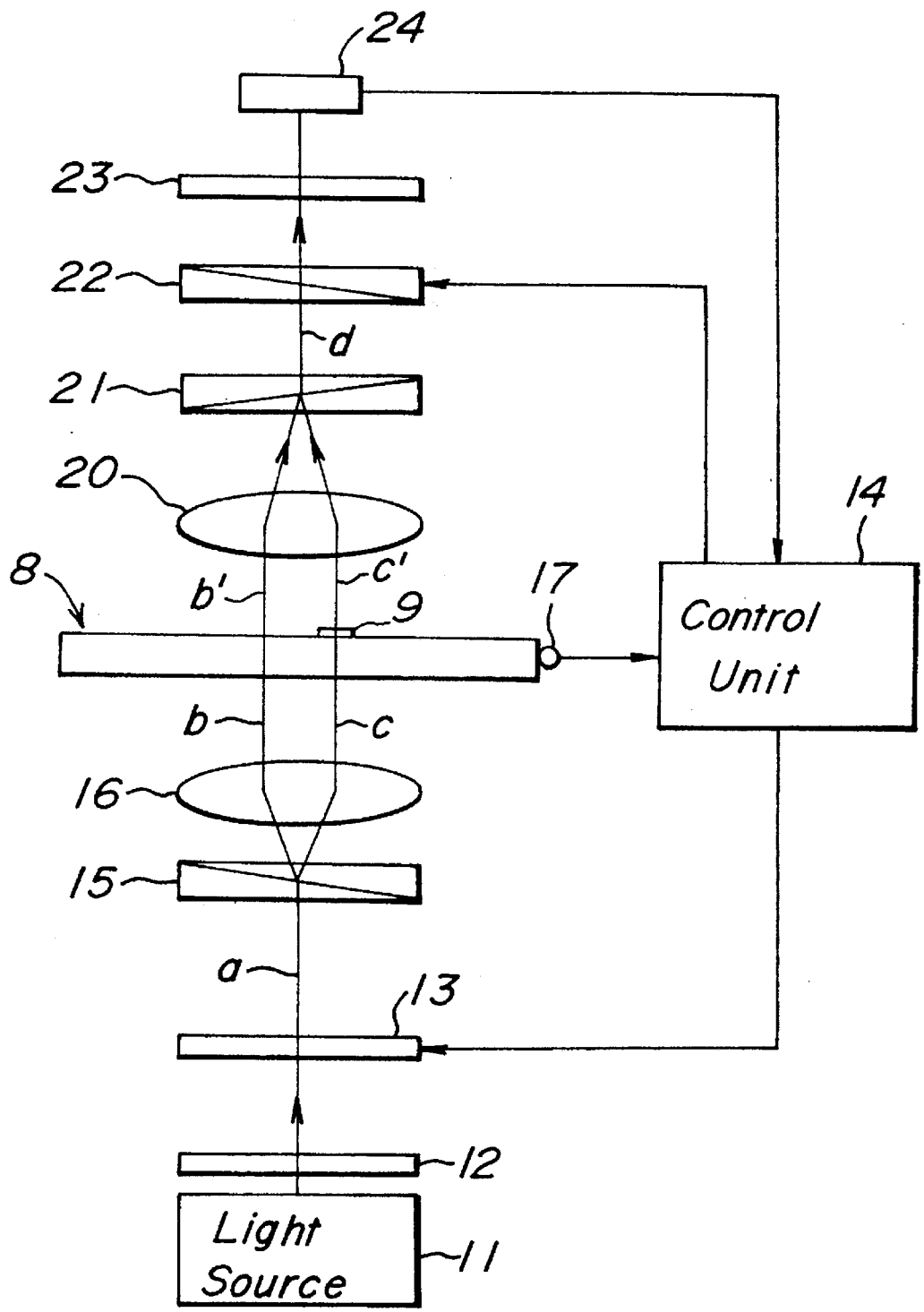
FIG. 1 is a schematic view showing a first embodiment of the phase difference measuring apparatus according to the invention.
Figure 2:
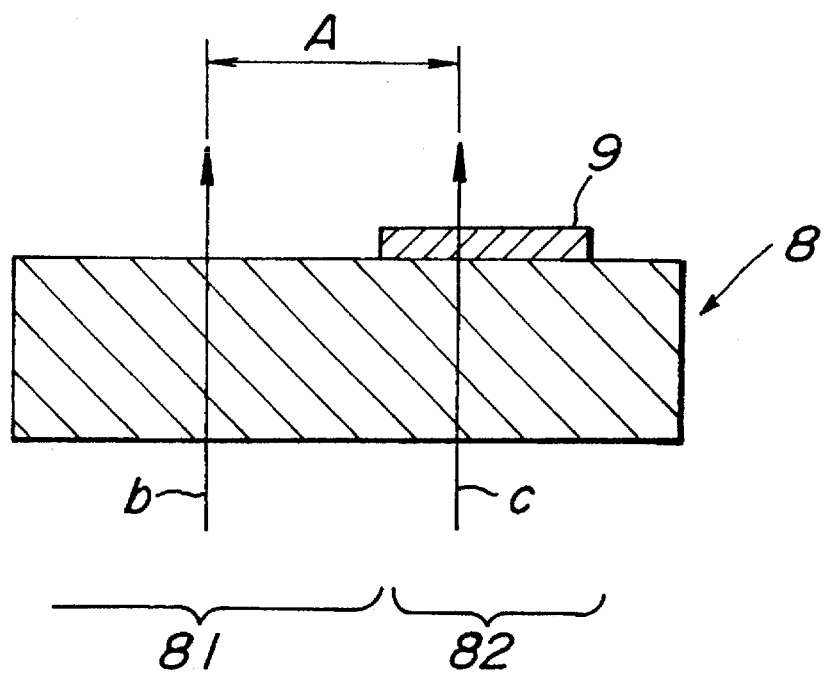
FIG. 2 is a schematic cross sectional view of the photomask.

FIG. 1 is a schematic view showing a first embodiment of the phase difference measuring apparatus according to the first aspect of the present invention. In the present embodiment, a phase difference introduced by a phase portion of a half-tone photomask is measured. As illustrated in FIG. 2, a half-tone photomask 8 includes a transparent portion 81 and a phase shift portion 82 including a half-tone phase film 9 which introduces a phase difference as well as an intensity difference with respect to a light flux transmitted through the transparent portion 81, That is to say, a phase and an intensity of a light flux transmitted through the phase shift portion 82 are different from those of a light flux transmitted through the transparent portion 81. In this connection, it should be noted that the phase shift portion 82 is not formed to cut off light completely, but can still transmit light. Therefore, such a photomask is termed as a half-tone photomask or half-tone mask. Such a half-tone photomask has been widely used in a photolithography for manufacturing semiconductor devices.

The phase difference measuring apparatus comprises light source 11, interference filter 12 and polarizer 13 which can rotate a polarizing direction of a light flux transmitted therethrough. The apparatus further comprises optical crystal element 15, condenser lens 16, objective lens 20, optical crystal element 21, phase compensating plate 22, analyzer 23 and photoelectric converter 24. There is further provided a control unit 14 for controlling a rotation of the polarizer 13. The control unit 14 further controls the operation of the phase compensation plate 22. The above mentioned half-tone photomask 8 is placed between the condenser lens 16 and the objective lens 20.

In the present embodiment, the interferometer having a common optical path is constructed, so that it is sufficient to insert only one photomask in the optical path. The light source 11 and interference filter 12 are constructed such that the half-tone photomask 8 is irradiated with light having a wavelength which is identical with that of light which is used to project an image of the photomask onto a workpiece such as a semiconductor wafer in an actual photolithography.

The polarizer 13 constituting the polarization rotating means is rotated in accordance with a difference in density between the transparent portion 81 and a half-tone portion or phase shift portion 82 of the photomask 8. Preferably, a ratio of a transmissivity of the transparent portion 81 to that of the phase shift portion 82 is detected and a rotating means is driven in accordance with the thus detected ratio.

Now the operation of rotating the polarizer 13 will be explained. The optical crystal element 15 may be formed by a birefringent prism which divides a linearly polarized light flux a into two light fluxes b and c having different polarizing planes or polarizing directions. Then, the thus separated two light fluxes are made incident upon the photomask 8 by means of the condenser lens 16 such that the light flux b is made incident upon the transparent portion 81 and the other light flux c is made incident upon the phase shift portion 82. In the present invention, since the half-tone photomask 8 is inspected, it is necessary to make the two light fluxes to have different intensities such that an intensity of the light flux b' transmitted through the transparent portion 81 becomes identical with an intensity of the light flux c' transmitted through the phase shift portion 82. That is to say, a ratio of an intensity Ib of the light beam b with respect to an intensity Ic of the light flux a (Ib/Ic) becomes inversely proportional to a ratio of a transmissivity of the transparent portion 81 with respect to that of the phase shift portion 82 (Tb/Tc). Then, Ib/Ic∝Tc/Tb, so that an intensity Ib' of the light flux b' transmitted through the transparent portion 81 and an intensity Ic' of the light flux c' transmitted through the phase shift portion 82 becomes equal to each other (Ib'=Ic'). It should be noted that according to the invention, although it is preferable to set a ratio (Ib/Ic) of an intensity of the light flux b to that of the light flux c to a ratio of a transmissivity of the phase shift portion to that of the transparent portion, it is sufficient to make an intensity Ib of the light flux b higher than an intensity Ic of the light flux c. In the present embodiment, there is provided a transmissivity ratio input device 17 which supplies a signal representing said ratio Tb/Tc to the control unit 14 and the control unit operates to rotate the polarizer 13 in accordance with the signal supplied from the input device 17. It should be noted that the rotation of the polarizer 13 may be performed by various methods as will be explained later.

A separation distance A between the two light fluxes b and c on the photomask 8 may be set to any desired value as long as these light fluxes are made incident upon the adjacent transparent portion 81 and phase shift portion 82 of the photomask, respectively. The separation distance A is determined by a separation angle of the birefringent prism 13, i.e. an angle between the two light fluxes b and c, and a focal length of the condenser lens 16. It is preferable to set the separation distance A to be equal to a distance between centers of adjacent transparent portion 81 and the phase shift portion 82 in a repetition pattern, e.g. stripe pattern.

In the two light fluxes b' and c' transmitted through the transparent portion 81 and phase portion 82 of the photomask 8, there is produced a phase difference due to the phase difference of the photomask. These light fluxes are made incident upon the objective lens 20, optical crystal element 21, phase compensating plate 22 and analyzer 23. The construction and function of these optical elements are identical with those of the known phase difference measuring apparatus disclosed in the above mentioned Japanese Patent Application Laid-open Publication Kokai Hei 4-151662.

The photodetector 24 converting the optical image into an electric signal comprises a CCD image sensor arranged on an image plane of the objective lens 20 and is connected to the control unit 14. The control unit 14 includes a display monitor and an operator can monitor a displayed image upon measuring the phase difference introduced by the phase shift portion 82 of the photomask 8. Adjustment of the phase difference by means of the phase compensating plate 22 is performed by the control unit 14. As stated above, the control unit 14 controls the rotation of the polarizer 13.

When a contrast of the interference image is low, the image is picked-up by the photodetector 24 and then the thus obtained electric image signal is processed to enhance the contrast. When a density of the phase shift portion 82 of the photomask 8 is rather high, an intensity of the light flux b impinging upon the transparent portion 81 has to be low, so that a brightness of the interference image is very weak. In such a case, the image may be picked-up by the photodetector 24 for a relatively long time period. In other words, the interference image may be integrated over a given time.

The light flux emitted by the light source 11 is made incident upon the interference filter 12 which transmits a light flux a having a wavelength which is identical with that of exposing light used in an actual photolithography. Then, the light flux a is made incident upon the polarizer 13 whose polarizing plane can be rotated under the control of the control unit 14. The light flux a is then made incident upon the crystal element 15 and is divided into the two light fluxes b and c having different polarizing directions as well as adjusted intensities, and these two light fluxes are projected by the condenser lens 16 onto the photomask 8.

As stated above, the separation distance A of these two light fluxes b and c is determined by a position of the entrance pipil of the condenser lens 16 and the apex angle of wedge-shaped crystal element 15. As illustrated in FIG. 2, the separation distance A is determined such that the two light fluxes b and c are made incident upon the transparent portion 81 and phase shift portion 82, respectively and a change in a contrast of the interference image. In a recent photolithography, there is generally used a design rule of 0.2 to 0.3 μm and an image of the photomask reduced by five is projected on a workpiece such as a semiconductor wafer, and therefore it is sufficient to set the separation distance A at least to 1.0 μm. It should be noted that the separation distance A may be set to be identical with a distance between centers of adjacent transparent portion and phase shift portion in a repetition pattern. The distance between centers of adjacent portions of the photomask varies from 1.0 to 3.0 μm, and thus the separation distance A may be generally set to 1.0 to 3.0 μm.

By rotating the polarizer 13, intensities of the light fluxes b and c can be adjusted in opposite senses. That is, when the polarizer 13 is rotated in such a direction that an intensity of the light flux b is increased, an intensity of the other light flux c is decreased. As stated above, it is preferable to adjust intensities of the light fluxes b and c such that a ratio Ib/Ic of an intensity of the light flux b to an intensity of the light flux c becomes equal to a ratio Tc/Tb of a transmissivity of the phase shift portion to a transmissivity of the transparent portion. Then, intensities of the light fluxes b' and c' emanating from the photomask 8 become substantially identical with each other. Further, there is introduced a phase difference between these two light fluxes b' and c' due to the phase shifter 9. Therefore, when the two light fluxes b' and c' are combined by the objective lens 29 and optical crystal element 21, there is formed the interference image having a sufficiently high contrast.

According to the invention, the polarizer 13 may be rotated manually while the image of the interference image is monitored. Further, the image signal derived by the photodetector 24 may be processed and the polarizer 13 may be rotated in accordance with a result of this image processing. In this case, the polarizer 13 may be rotated automatically.

The two light fluxes b' and c' emanating from the photomask 8 have been subjected to the phase difference and are combined with each other by means of the objective lens 20 and birefringent prism 21, so that there is formed the interference image on the focal plane of the objective lens. Then, a contrast of the half-tone portion 82 is changed in accordance with the phase difference, and thus by adjusting the phase difference between the two light fluxes, it is possible to detect a phase difference due to the phase shifter 9 on the photomask 8. It should be noted that since the two light fluxes have mutually orthogonal polarizing components, the phase difference has to be adjusted by the phase compensating plate 22 and then the two light fluxes have to be made incident upon the analyzer 23. A manner of measuring the phase difference has been described in detail in the above mentioned Kokai Hei 4-151662.

The two light fluxes b' and c' emanating from the photomask 8 are combined by means of the objective lens 20 and the birefringent crystal element 21 such as a Nomarski prism or a Wollaston's prism similar to the birefringent crystal element 15. Then, a combined light flux d is transmitted through the phase compensating plate 22 to adjust the phase difference between the two light fluxes b' and c' having different polarizing directions. Then the light flux d is transmitted through the analyzer 23 whose polarizing direction is set to be 45 degrees with respect to the mutually orthogonal polarizing directions of the light fluxes b' and c'. Finally, the light flux d is received by the photodetector 24 which is arranged on the focal plane of the objective lens 20. The light fluxes b' and c' are subjected to the phase difference due to the phase shifter 9 of the photomask 8, and thus when a component vibrating in a direction which is the same as the analyzer 23 is detected, there is formed an interference image on the photodetector 24.

In this manner, according to the present embodiment, the phase difference introduced by the half-tone photomask including the transparent portions and phase shift portions or phase shifters can be measured easily and accurately.

Figure 3:
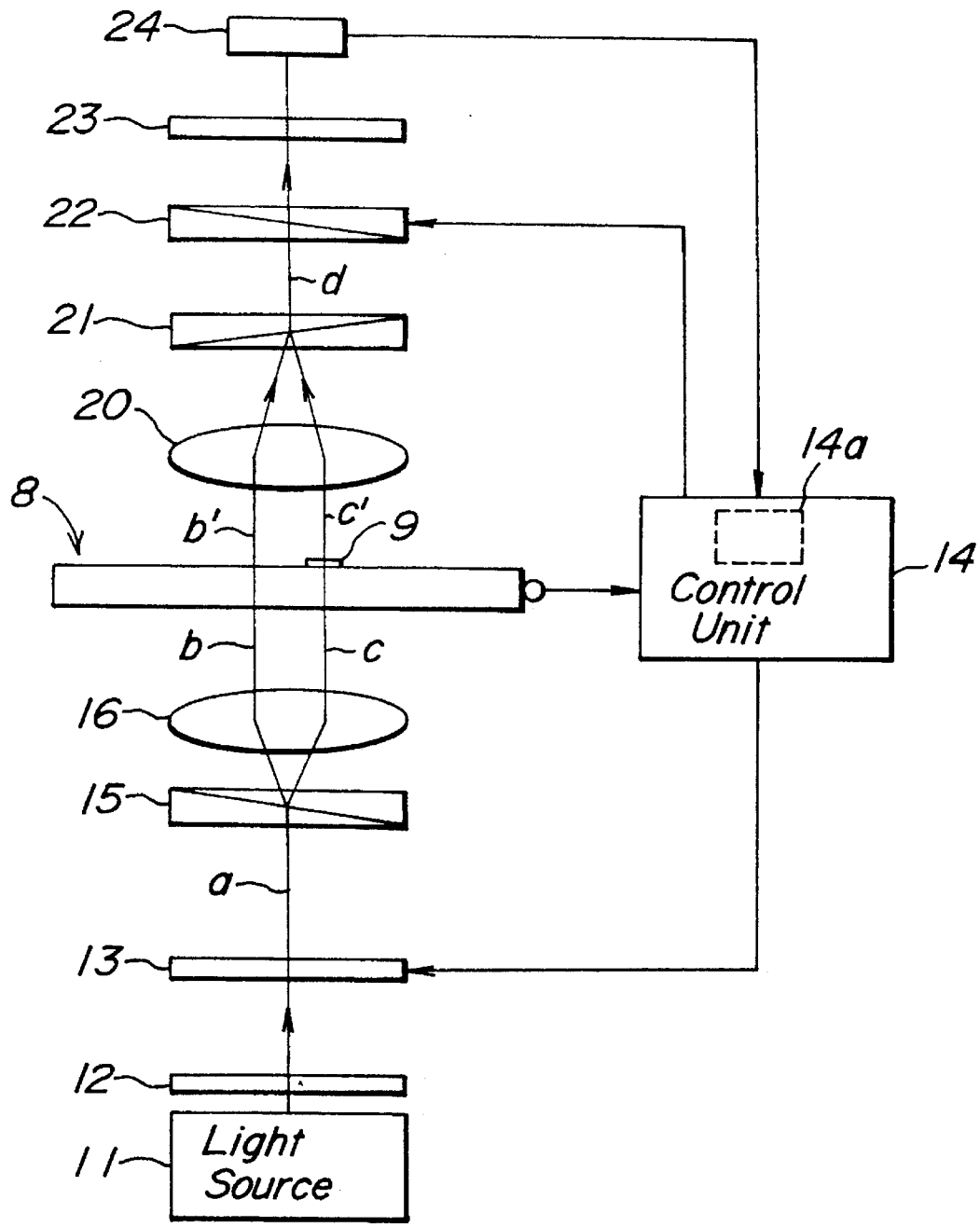
FIG. 3 is a schematic view illustrating a second embodiment of the phase difference measuring apparatus according to the invention.

FIG. 3 is a schematic view showing a second embodiment of the phase difference measuring apparatus according to the first aspect of the invention, which is particularly suitable for a half-tone photomask with phase shift portions having a relatively high density. In this case, an intensity of a light flux transmitted through a transparent portion has to be decreased, and thus a brightness of an interference image becomes very low. In the present embodiment, the interference image is integrated for a relatively long time period.

As illustrated in FIG. 3, the control unit 14 comprises a time integrating section 14a for integrating the interference image for a given time period, The remaining construction of the present embodiment is identical with that of the first embodiment shown in FIG. 1. In the present embodiment, even if a brightness of the interference image is low, it is possible to obtain an image signal having a high S/N by integrating the image for a long time period. It should be noted that such an integrating operation is possible owing to the reason that the light fluxes b' and c' enamating from the photomask have substantially same intensities. The integration of the image may be performed by an image processing or by a long time exposure to the photodetector 24.

Figure 4:
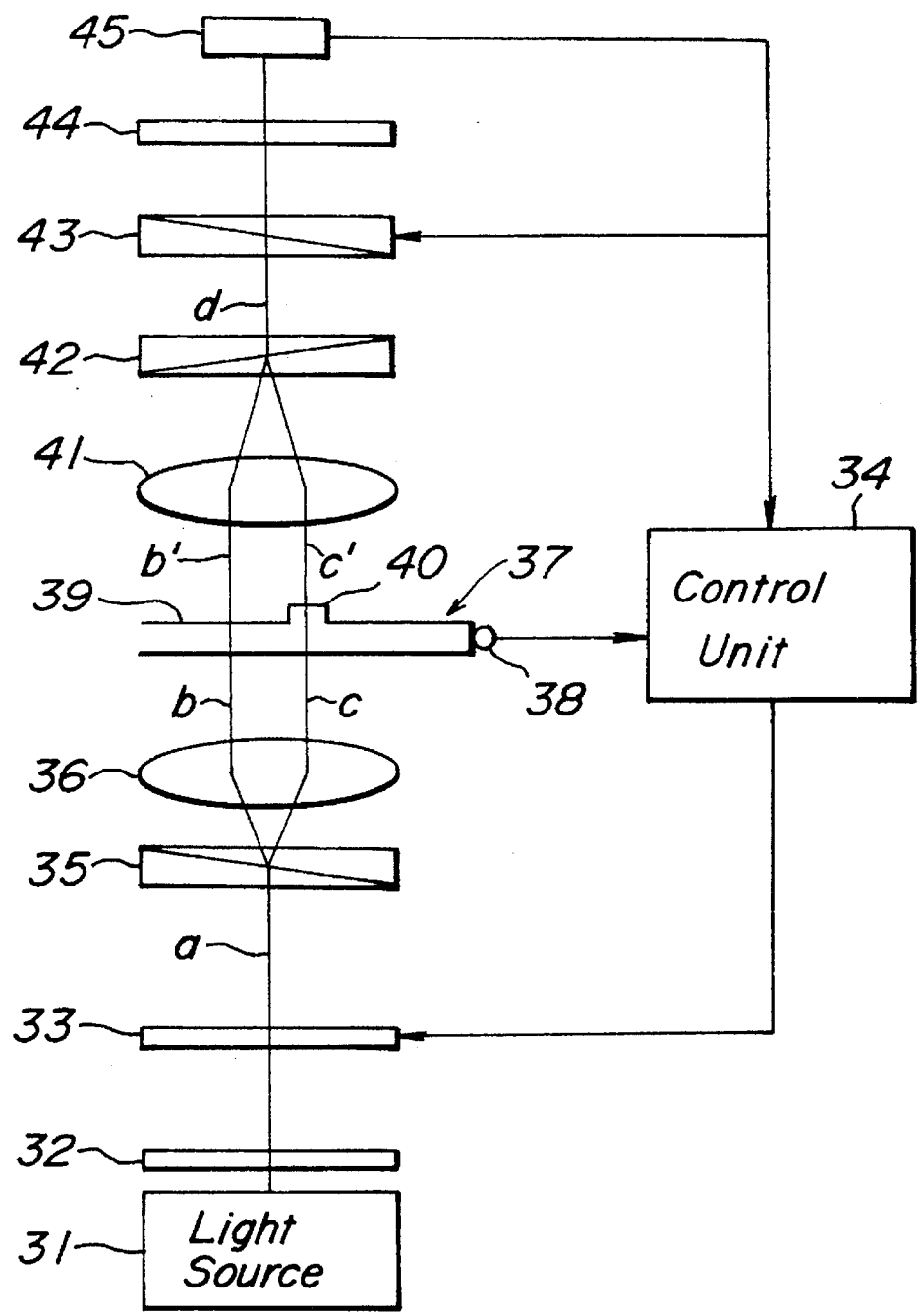
FIG. 4 is a schematic view depicting a third embodiment of the phase difference measuring apparatus according to the invention.

FIG. 4 is a schematic view depicting a third embodiment of the phase difference measuring apparatus according to the second aspect of the present invention. In the present embodiment, a phase difference caused by a reticle 37 is to be measured. The reticle 37 is generally used as an original photomask in a photolithography manufacturing semiconductor devices. The reticle 37 is formed by etching a silicon oxide plate such that there are formed transparent portions 39 and phase shift portions 40 having a thickness larger than that of the transparent portions.

As illustrated in FIG. 4, the phase difference measuring apparatus comprises a light source 31, which may be constituted by a lamp emitting white light. The apparatus further comprises a band pass filter 32 for extracting a component having a wavelength which is equal to that of exposing light under which the reticle 37 is actually exposed during the photolithography. A light flux enamating from the band pass filter 32 is then made incident upon a polarizer 33 which is arranged rotatably. The rotation of the polarizer 33 is controlled by a control unit 34, Therefore, it is possible to derive a light flux having a wavelength equal to that of the exposing light and being polarized in a direction which is determined by a rotational position of the polarizer 33.

The linearly polarized light flux a enamating from the polarizer 33 is made incident upon an optical crystal element 35 and is divided into two light fluxes b and c polarized in mutually different directions. The optical crystal element 35 may be formed by a birefringent prism. Then, the two light fluxes b and c emanating from the prism 35 are polarized in mutually orthogonal directions. Then, the two light fluxes are projected onto the reticle 37 by means of a condenser lens 36. The condenser lens 37 is arranged such that an entrance pupil situates at a separation point of the birefringent prism 36, so that the two light fluxes b and c are made incident upon the reticle 37 perpendicularly thereto. According to the invention, a separation distance of the two light fluxes b and c viewed on the reticle 37 is determined such that one light flux b is made incident upon the adjacent transparent portion 39 of the reticle 37 and the other light flux c is made incident upon the phase shift portion 40. Similar to the previous embodiments, by rotating the polarizer 33, a ratio of intensities of the two light fluxes b and c can be adjusted in mutually opposite senses. When a transmissivity of the transparent portion 39 differs from that of the phase shift portion 40, an intensity of the light flux c to be transmitted through the phase shift portion is increased and an intensity of the light flux b to be transmitted through the transparent portion is decreased such that intensities of light fluxes b' and c' enamating from the reticle 37 become substantially identical with each other. To this end, in the present embodiment, there is provided an input device 38 entering a ratio of a transmissivity of the transparent portion 39 of the reticle 37 to a transmissivity of the phase shift portion 40. Then, the control unit 34 operates to rotate the polarizer 33 much that a ratio of an intensity of the light flux b to an intensity of the light flux c becomes inversely proportional to said ratio of transmissivities.

It should be noted that according to the second aspect of the present invention, it is not always necessary to rotate the polarizer in the above mentioned manner, and a substantially same function may be attained by various methods.

The light fluxes b' and c' enamating from the reticle 37 are then made incident upon objective lens 41, optical crystal element 42, phase compensating plate 43 and analyzer 44. The two light fluxes b' and c' are combined by the optical crystal element 42 including a birefringent prism to produce an interference image, and a phase difference between the light fluxes b' and c' is changed by rotating the phase compensating plate 43. The analyzer 44 extracts a given linearly polarized light component in the interference image, The light flux emanating from the analyzer 44 is finally made incident upon a photodetector 45 including CCD image sensor, area image sensor such as an image pick-up tube, position sensor diode (PSD) and photomultiplier tube and linear image sensor.

Now it is assumed that a separation angle of the two light fluxes b and c is θ (in the present embodiment, an apex angle of a wedge shaped prism of the optical crystal element 35), a focal length of the condenser lens 36 is f, a combining angle at the combining means 43 is θ', and a focal length of the objective lens 41 is f'. Then, a separation distance Δ of the two light fluxes b and c on the reticle 37 becomes equal to a product of the focal length f of the condenser lens 36 and the separation angle θ as well as a product of the focal length f' of the objective lens 41 and the combining angle θ' of the combining means 43 (Δ=f·θ=f'·θ'), Now it is further assumed that a standard distance between centers of adjacent transparent portion 39 and phase shift portion 40 is P. Then, according to the second aspect of the invention, the following condition is satisfied:

$$0.25 \leq \Delta/P = f \cdot \theta/P = f' \cdot \theta'/P \leq 2.0 \quad (1)$$

The reticle 37 has many transparent portions 39 and phase shift portions 40 and distances between adjacent transparent portions and phase shift portions are not constant, but spread on both sides of the standard separation distance P. According to the invention, the separation distance Δ between the two light fluxes b and c measured on the reticle 37 is set to a value within a range from ¼P to 2P, Then, the light fluxes b and c are made incident upon the transparent portion 39 and phase shift portion 40, respectively and a change in a brightness of the interference image formed on the photodetector 45 can be detected.

In the present embodiment, in order to measure the phase difference introduced by the phase shift portion 40 of the reticle 37, an intensity of the interference image formed on the photodetector 45 is controlled in a stepwise manner under the control of the control unit 34 as will be explained later in detail.

Figure 5:
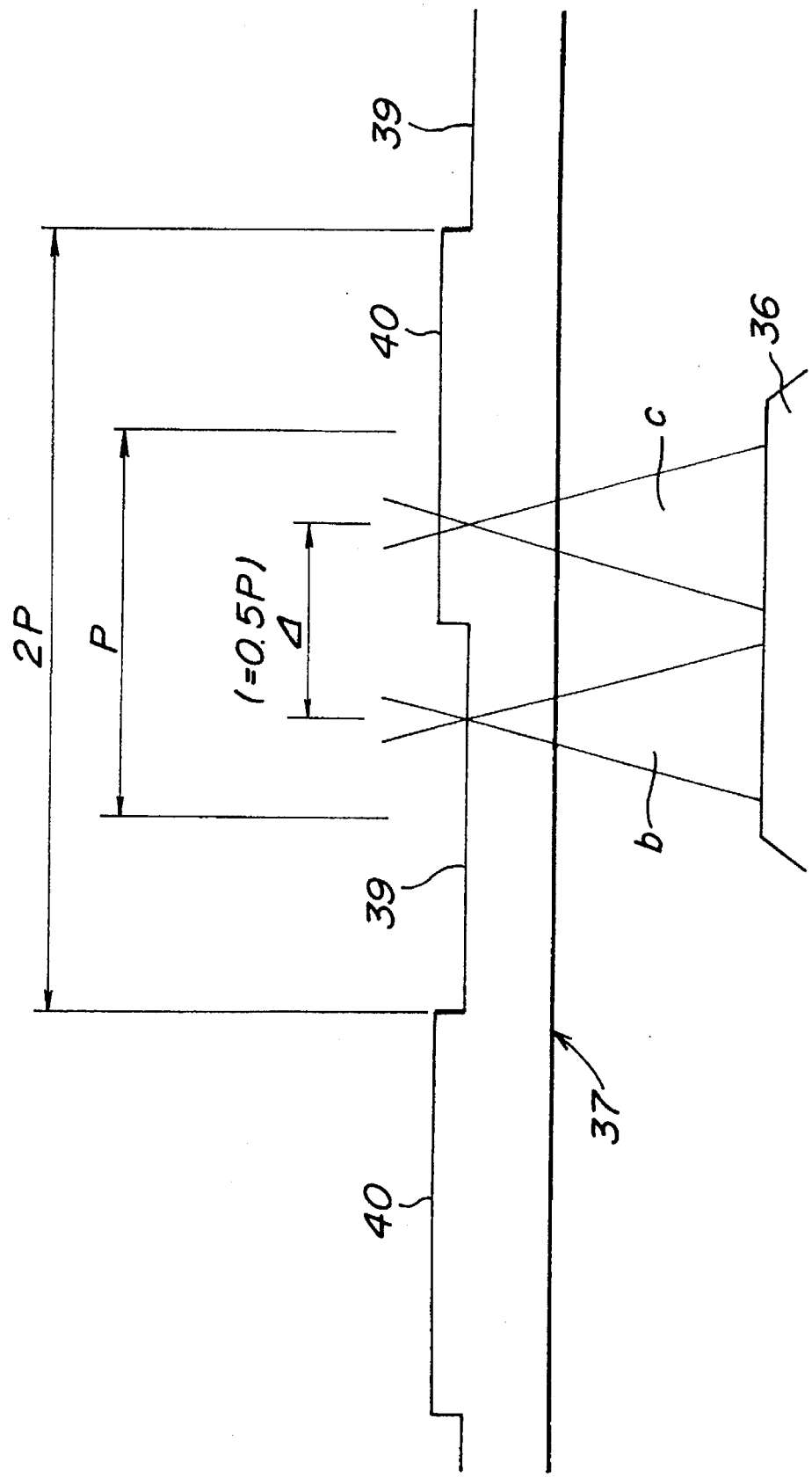
FIG. 5 is a schematic cross sectional view of the photomask.

FIG. 5 is a schematic cross sectional view of the reticle 37. As explained above, the reticle 37 comprises a silicon oxide substrate having the transparent portions 39 and phase shift portions 40 formed by etching. These portions 39 and 40 have different thicknesses, and thus the light fluxes b' and c' emanating from the transparent and phase shift portions have a phase difference. In general, the reticle 37 has a repetition pattern, and it is now assumed that the repetition pattern has a standard repetition pitch P. As depicted in FIG. 5, the pitch P is a distance between centers of adjacent typical transparent portion and phase shift portion. Further, a distance between successive phase shift portions 40 becomes 2P. In FIG. 5, the separation distance Δ between the two light fluxes b and c on the reticle 37 is set to a half of the pitch P of the pattern (Δ=0.5P). Then, the interference image can have a sufficiently large change in brightness, so that the phase difference can be measured positively.

Now a method of measuring the phase difference by changing an intensity of the interference image will be explained. A general method of measuring a phase configuration of a phase substance by changing an intensity of an interference image has been described in detail in "Applied Physics—Introduction of Optical Measurement-A", Toyahiko YATAGAI, p. 131–135.

A theory of differential interference method in microscope can be applied to the present invention. Now it is assumed that a phase difference introduced by the reticle is denoted by $\phi(x, y)$ and a phase difference modulated by the phase compensating plate 43 is $\delta_i$. Then, an intensity $I(x, y)$ of the interference image formed by the two light fluxes may be expressed as follows:

$$I_i(x, y) = I_0[1 + \gamma \cos(\phi(x, y) + \delta_i)] \quad (2)$$

Now the phase modulation $\delta_i$ at a measuring point (x, y) is changed within a range from 0 to $2\pi$ in a stepwise manner, i.e. in n steps ($\delta_i = 2\pi i/n$; i=0, 1 and n−1), and an intensity $I_i(x, y)$ is measured. Then, the phase difference $\phi(x, y)$ introduced by the reticle may be calculated as follows:

$$\phi(x, y) = -\tan^{-1}\left[\frac{\sum_{i=0}^{n-1} I_i(x, y)\sin\delta_i}{\sum_{i=0}^{n-1} I_i(x, y)\cos\delta_i}\right] \quad (3)$$

When the number of steps n is set to 4 (n=4), $\delta_i$ is set to 0, $\pi/2$, $\pi$ and $3\pi/2$ to obtain intensities of the interference image $I_0$, $I_1$, $I_2$ and $I_3$, the phase difference $\phi(x, y)$ may be calculated as follows:

$$\phi(x, y) = -\tan^{-1}\frac{I_3 - I_1}{I_0 - I_2} \quad (4)$$

In this manner, according to the invention, the phase difference introduced by the reticle can be measured by effecting the measurement of an intensity of the interference image by at least four times, The control unit 34 is constructed to perform the above measurement. In this case, the phase compensating plate 43 is rotated in an intermittent manner into positions for intruding the phase differences $\delta_i$ of 0, $\pi/2$, $\pi$ and $3\pi/2$ successively, and the intensities of the interference image $I_0$, $I_1$, $I_2$ and $I_3$ at said positions are measured successively. Alternatively, the phase compensating plate 43 may be rotated continuously and an intensity of the interference image is measured or sampled at given time instances at which the phase difference introduced by the phase compensating plate 43 becomes equal to 0, π/2, π and 3π/2. In this manner, the intensities $I_0$, $I_1$, $I_2$ and $I_3$ of the interference image are stored in a memory in the control unit 34 and the phase difference φ(x, y) introduced by the reticle can be calculated in accordance with the equation (4). In this case, it should be noted that it is no longer necessary to rotate the phase compensating plate 43 such that the intensity of the interference image becomes maximum or minimum, although in a case in which n is not equal to 4, terms of $\sin\delta_i$ and $\cos\delta_i$ in the equation (3) have to be calculated.

Figure 6A:
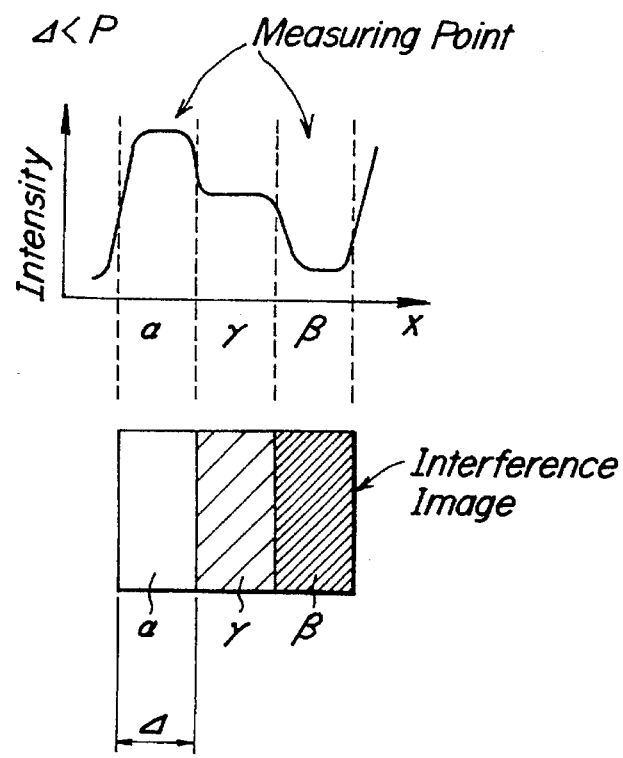
FIGS. 6A, 6B and 6C are schematic views of the interference image.
Figure 6B:
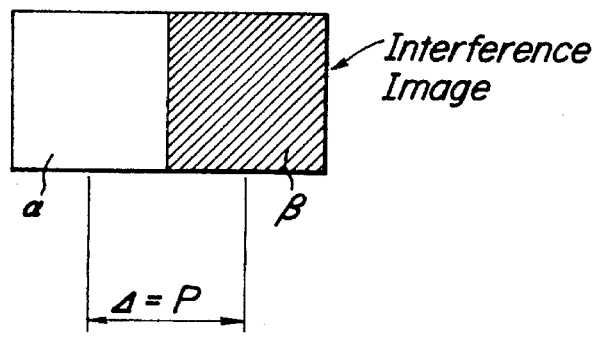
Figure 6C:
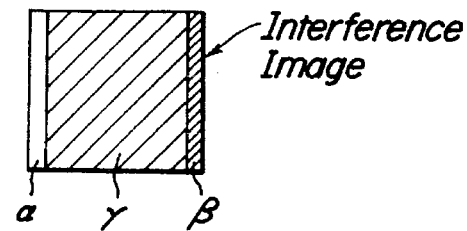

FIGS. 6A to 6C illustrate the interference image for different values of the separation distance Δ, FIG. 6A shows a case in which the separation distance is set to 0.5P, FIG. 6C depicts the interference image for the separation distance equal to the pitch P, and FIG. 6C illustrates a case in which the separation distance is set to a value very much smaller than P. As shown in FIG. 6A, when the separation distance Δ is set to 0.5P, the phase shift portion of the reticle is observed as double images. When the phase compensation plate 43 is rotated, an intensity or a brightness of a middle area γ is changed in accordance with a contrast change $\delta_i$ of a whole field of view, but intensities of left and right hand areas α and β are changed in mutually opposite senses in accordance with the phase difference φ(x, y)+$\delta_i$. That is, when a brightness of the left hand area α is increased by a certain amount, a brightness of the right hand area β is decreased by the same amount. These right and left portions constitute an intensity change area whose intensity is measured during the adjustment of the phase difference by means of the phase compensating plate. Therefore, there can be set two measuring points or areas for a single phase shift portion. Further, a desired phase difference can be estimated by averaging two phase differences φ($x_1$, $y_1$) and φ($x_2$, $y_2$) of the phase shift portions which are obtained by a single measurement. Of course, it is possible to perform the measurement by using only one measuring point. According to the invention, it is sufficient to set at least one measuring point or area within a brightness change area in the interference image. It is possible to perform the above operation by means of the control unit 34 coupled with the phase compensation plate 43 and photodetector 45.

It is matter of course that in the case shown in FIG. 6B, at least one measuring point may be set in at least one area α or β. Of course, there may be set measuring points on respective areas α and β.

Figure 7:
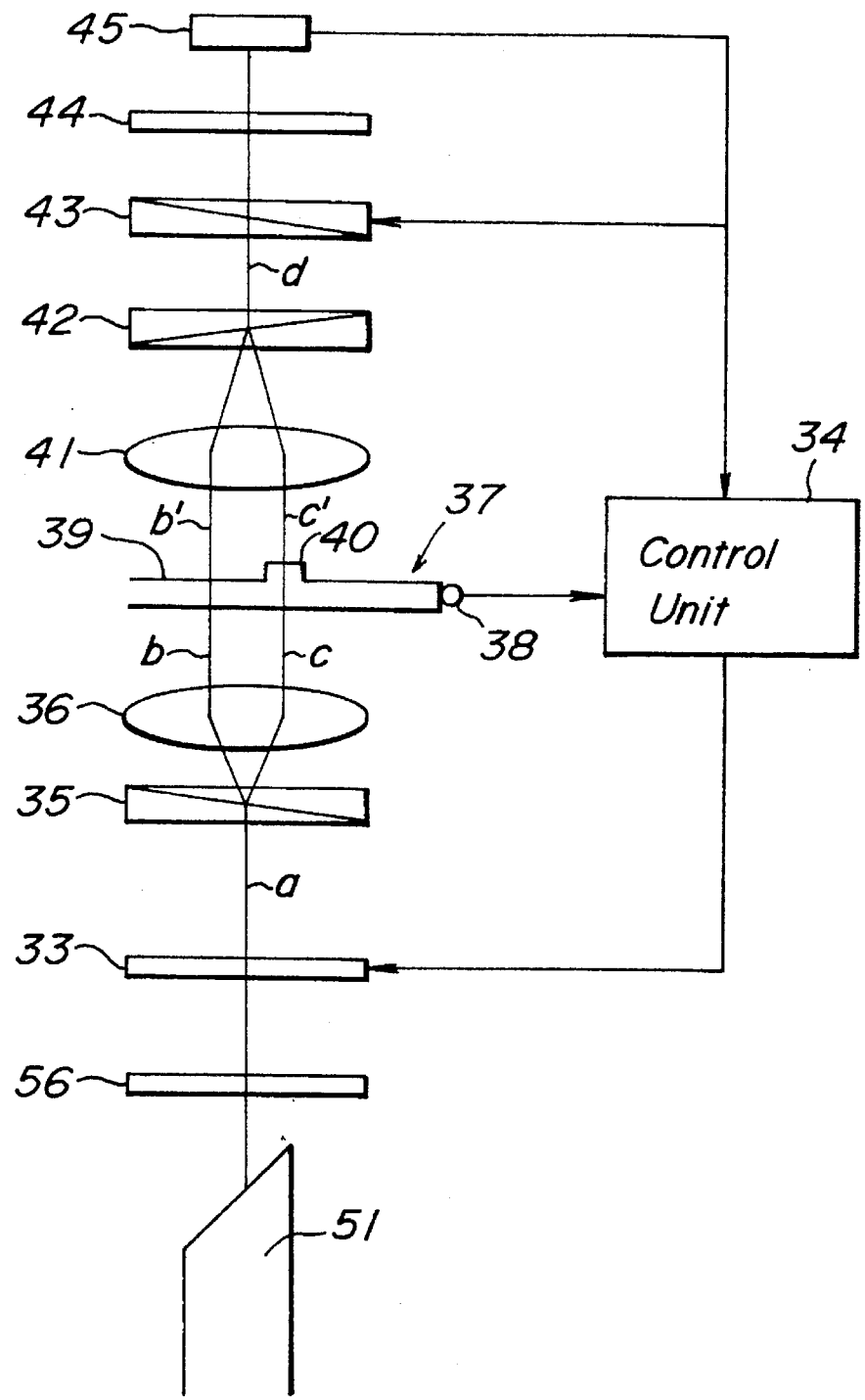
FIG. 7 is a schematic view showing a third embodiment of the phase difference measuring apparatus according to the invention.

FIG. 7 is a schematic view showing a fourth embodiment of the phase difference measuring apparatus according to the second aspect of the present invention, In the present embodiment, there are provided a laser light source 51 instead of the light source 31 in FIG. 4 and a λ/4 plate 56, and the remaining construction is entirely same as that of the embodiment illustrated in FIG. 4.

A laser beam emitted by the laser light source 51 is a linearly polarized thin beam having a single wavelength. The linearly polarized beam is converted by the λ/4 plate 56 into a circularly polarized beam. If the laser light source emits a laser beam having a wavelength other than a desired wavelength, a band pass filter may be arranged like the third embodiment.

FIG. 8 is a schematic cross sectional view of the reticle 37 including the transparent portion 39 and phase shift portion 40 and FIG. 9 is a schematic plan view. Also in the present embodiment, the separation distance Δ between the two laser beams b and c is set such that the laser beam b is made incident upon the transparent portion 39 and the laser beam c is made incident upon the phase shift portion 40. In case using the laser beams, the separation distance Δ may be determined such that these two laser beams are not superimposed upon each other. Therefore, it is not necessary to set Δ=P.

Also in the present embodiment, intensities of the two laser beams b and c can be adjusted in opposite senses by rotating the polarizer 33, and the phase difference introduced by the reticle 37 can be measured by the same method as that of the third embodiment. In the present embodiment, intensities of these beams b and c are very high, so that a contrast of the interference image becomes extremely high and the measurement data of high precision can be obtained. The laser beams b' and c' emanating from the reticle 37 are combined by the optical crystal element 42, and thus a dimension of a detection area of the photodetector 45 may be corresponded to a diameter of the interference beam. Therefore, it is also possible to provide an observing optical system in addition to the measuring optical system. By using such an observing optical system, the alignment of the laser beams b and c with respect to the reticle 37 may be performed easily.

As explained above in detail, in the method and apparatus for measuring the phase difference according to the invention, by rotating the polarizing direction of the light flux to be made incident upon the birefringent prism, intensities of the light fluxes to be made incident upon the transparent and phase shift portions of the half-tone photomask can be adjusted in mutually opposite senses, and thus intensities of the light fluxes emanating from the photomask can be made substantially identical with each other. Therefore, it is possible to obtain the interference image having a high contrast, and thus the phase difference can be measured precisely. Further, by performing the integration of the interference image, it is possible to measure the phase difference accurately, Moreover, the phase difference measuring apparatus according to the invention is hardly affected by aberrations of optical systems, mechanical vibration and temperature variation.

According to the invention, it is also possible to measure the phase difference introduced by various kinds of reticles be setting the separation distance between the two light fluxes being made incident upon the reticle to such a value which satisfies the above mentioned condition (1), although the pitch of the repetition pattern of the reticle is small or large, Further, by adjusting the phase difference due to the phase compensating plate in a stepwise manner and measuring intensities of the interference image, the phase difference due to the photomask can be measured simply and precisely.

What is claimed is:

1. An apparatus for measuring a phase difference of an object having a pattern including a transparent portion which transmits a first portion of a light flux and a phase shift portion which changes an intensity as well as a phase of a second portion of said light flux, comprising:

a light source means for emitting said light flux;

a polarization rotating means for converting the light flux emitted by said light source means into a linearly polarized light flux and for controllably rotating a polarizing direction of the linearly polarized light flux;

a beam separating means having a birefringency for dividing said linearly polarized light flux into the first and second portions so that polarizing directions of the first and second portions are different from each other;

a condenser lens system for projecting said first and second portions onto the object;

an objective lens system for forming an image of the pattern of the object illuminated by said first and second portions;

a combining means having a birefringency for combining said first and second portions emanating from the objective lens system;

a phase difference adjusting means for changing a phase difference between said first and second portions; and a detecting means for selectively detecting given linearly polarized components of an interference image formed by the first and second portions;

said detecting means comprising a means for detecting a ratio of a transmissivity of the transparent portion of the object with respect to a transmissivity of the phase shift portion to derive a transmissivity ratio signal and a means for controlling said polarization rotating means in accordance with said transmissivity ratio signal to rotate the polarizing direction of the linearly polarized light flux.

2. An apparatus according to claim 1, wherein said detecting means further comprises a means for integrating the interference image with respect to time.

3. An apparatus according to claim 1, wherein said detecting means further comprises a photodetecting means for converting the interference image into an electric signal and a means for processing said electric signal to enhance a contrast between the first and second portions.

4. An apparatus according to claim 1, wherein said separating means includes a birefringent prism, and a separation angle between the first and second portions by said birefringent prism and a focal length of said condenser lens system are set such that when said first and second portions are projected onto the object by means of said condenser lens system, a distance between the first and second portions viewed on the object is substantially identical with a distance between said transparent portion and said phase shift portion, said phase shift portion being adjacent to said transparent portion.

5. An apparatus according to claim 1, wherein said separating means includes a birefringent prism, and a separation angle of the first and second portions by said birefringent prism and a focal length of said condenser lens system are set such that when said first and second portions are projected onto the object by means of said condenser lens system, a distance between the first and second portions viewed on the object is set to such a value that one of the first and second portions is made incident upon said transparent portion and the other of the first and second portions is made incident upon said phase shift portion, said phase shift portion being adjacent to said transparent portion.

6. An apparatus according to claim 1, wherein said separating means includes a birefringent prism, and a separation angle of the first and second portions by said birefringent prism and a focal length of said condenser lens system are set such that when said first and second portions are projected onto the object by means of said condenser lens system, a distance between the first and second portions viewed on the object is set to such a value that a distance between the first and second portions viewed on the object becomes substantially identical with a pitch of repetition pattern of said transparent portion and said phase shift portion.

7. An apparatus according to claim 1, wherein said separating means includes a birefringent prism, and a separation angle between the first and second portions by said birefringent prism and a focal length of said condenser lens system are set such that when said first and second portions are projected onto the object by means of said condenser lens system, the first and second portions are made incident upon said transparent portion and said phase shift portion, which are adjacent within a repetition pattern of the object.

8. An apparatus according to claim 1, wherein said polarization rotating means comprises a polarizing plate which is arranged rotatably about an optical axis of said linearly polarized light flux.

9. An apparatus according to claim 1, wherein the object comprises a photomask, and said light flux has a wavelength equal to a wavelength of light used to produce the photomask.

10. An apparatus according to claim 1, wherein said combining means includes a birefringent prism.

11. An apparatus for measuring a phase difference of an object having a pattern including a transparent portion which transmits a first portion of a light flux and a phase shift portion which provides a given phase difference to a second portion of said light flux which is transmitted therethrough, said apparatus comprising:

a light source means for emitting said light flux;

a polarization rotating means for converting the light flux emitted by said light source means into a linearly polarized light flux;

a beam separating means having a birefringency for dividing said linearly polarized light flux into said first and second portions so that said first and second portions have polarizing directions which are different from each other;

a condenser lens system for projecting said first and second portions onto the object;

an objective lens system for forming an image of the pattern of the object by said first and second portions;

an imaging means for combining said first and second portions transmitted through said objective lens system;

a phase difference adjusting means having a birefringency for changing a phase difference between said first and second portions; and a detecting means for selectively detecting a given linearly polarized component of an interference image of the first and second portions;

wherein a separation distance $\Delta$ between said first and second portions on the object and a standard value P representing a distance between said transparent portion and said phase shift portion in a case in which said phase shift portion is adjacent to said transparent portion are set to satisfy the following condition:

$$0.25 \leq \Delta/P \leq 2.0$$

12. An apparatus according to claim 11, wherein said separating means comprises a birefringent prism, said combining means comprises a birefringent prism, and said birefringent prism of said separating means is constructed to satisfy the following condition:

$$\Delta/P = f\cdot\theta/P = f'\cdot\theta'/P$$

wherein $\theta$ is a separation angle by said separating means, f is a focal length of said condenser lens system, $\theta'$ is a combining angle of said combining means, and f' is a focal length of said objective lens system.

13. An apparatus according to claim 11, wherein said detecting means comprises means for changing the phase difference introduced by said phase difference adjusting means in a stepwise manner to give multiple phase differences $\delta_i$, i=0 to n, means for obtaining intensity modulation signals representing intensities $I_i(x, y)$ of the interference image at respective ones of said multiple phase differences and means for deriving said phase difference of the object on the basis of the multiple phase differences and the intensities of the interference image in accordance with the following equation:

$$\phi(x, y) = -\tan^{-1}\left[\frac{\sum_{i=0}^{n-1} I_i(x, y)\sin\delta_i}{\sum_{i=0}^{n-1} I_i(x, y)\cos\delta_i}\right]$$

wherein $\phi(x, y)$ is the phase difference introduced by the object.

14. An apparatus according to claim 11, wherein said polarizing means comprises a polarization rotating means for rotating the polarizing direction of said light flux at will such that intensities of the first and second portions impinging upon the transparent and phase shift portions of the object are adjusted in opposite senses.

15. An apparatus according to claim 14, wherein said polarization rotating means comprises a polarizer which is arranged rotatably about an optical axis of said light flux.

16. An apparatus according to claim 15, wherein the apparatus further comprises a means for rotating said polarizer such that intensities of the first and second portions emanating from the object become substantially identical with each other.

17. An apparatus according to claim 16, wherein said polarizer rotating means comprises a means for determining a transmissivity ratio of a transmissivity of the transparent portion to a transmissivity of the phase shift portion, and a means for rotating said polarizer such that a ratio of an intensity of the first portion impinging upon the transparent portion to an intensity of the second portion impinging upon the phase shift portion becomes inversely proportional to said transmissivity ratio.

18. An apparatus according to claim 11, wherein said object comprises a photomask, and said light flux has a wavelength equal to a wavelength of light used in forming said photomask.

19. A method of measuring a phase difference introduced by an object having a pattern of transparent portions and phase shift portions, said method comprising the steps of:

projecting two light fluxes linearly polarized in mutually different directions onto the object such that one of the two light fluxes is made incident upon one of the transparent portions and the other light flux is made incident upon one of the phase shift portions adjacent to said one of the transparent portions;

combining the two light fluxes transmitted through said object by means of a phase difference adjusting means to form an interference image;

detecting a predetermined polarized component of the interference image to derive an electric signal representing an intensity of the interference image;

changing a phase difference between said two light fluxes introduced by said phase difference adjusting means in a stepwise manner to introduce a plurality of phase differences $\delta_i$, i=0 to n; and calculating said phase difference introduced by said object by processing said electric signal in accordance with the phase differences introduced by said phase difference adjusting means.

20. A method according to claim 19, wherein said phase difference $\phi(x, y)$ introduced by the object is calculated in accordance with the plurality of phase differences $\delta_i$ introduced by said phase difference adjusting means and a plurality of intensities $I_i(x, y)$ of the interference image corresponding to the plurality of phase differences $\delta_i$ by performing the following calculation:

$$\phi(x, y) = -\tan^{-1}\left[\frac{\sum_{i=0}^{n-1} I_i(x, y)\sin\delta_i}{\sum_{i=0}^{n-1} I_i(x, y)\cos\delta_i}\right]$$

21. A method according to claim 20, wherein said phase difference adjusting means comprises a polarizer, said plurality of phase differences $\delta_i$ introduced by said phase difference adjusting means are made to equal 0, $\pi/2$, $\pi$ and $3\pi/2$ successively by rotating the polarizer in an intermittent manner, intensities $I_0, I_1, I_2$ and $I_3$ are successively measured at said plurality of phase differences, and the phase difference $\phi(x, y)$ introduced by the object is calculated as follows:

$$\phi(x, y) = -\tan^{-1}\frac{I_3 - I_1}{I_0 - I_2}$$

22. A method according to claim 20, wherein said phase difference adjusting means comprises a polarizer, said plurality of phase differences $\delta_i$ introduced by said phase difference adjusting means are achieved by rotating the polarizer in a continuous manner over a range from 0 to $2\pi$, intensities $I_0, I_1, I_2$ and $I_3$ of the interference image are successively measured when said phase differences $\delta_i$ becomes equal to 0, $\pi/2$, $\pi$ and $3\pi/2$ successively, and the phase difference $\phi(x, y)$ introduced by the object is calculated as follows:

$$\phi(x, y) = -\tan^{-1}\frac{I_3 - I_1}{I_0 - I_2}$$

23. An apparatus according to claim 13, wherein said polarizing means comprises a polarization rotating means for rotating the polarizing direction of said light flux at will such that intensities of the first and second portions impinging upon the transparent and phase shift portions of the object are adjusted in opposite senses.

24. An apparatus according to claim 23, wherein said polarization rotating means comprises a polarizer which is arranged rotatably about an optical axis of said light flux.

25. An apparatus according to claim 24, wherein the apparatus further comprises a means for rotating said polarizer such that intensities of the first and second portions emanating from the object become substantially identical with each other.

26. An apparatus according to claim 25, wherein said polarizer rotating means comprises a means for determining a transmissivity ratio of a transmissivity of the transparent portion to a transmissivity of the phase shift portion, and a means for rotating said polarizer such that a ratio of an intensity of the first portion impinging upon the transparent portion to an intensity of the second portion impinging upon the phase shift portion becomes inversely proportional to said transmissivity ratio.

* * * * *